US006374971B1

(12) United States Patent
Siciliano et al.

(10) Patent No.: US 6,374,971 B1
(45) Date of Patent: Apr. 23, 2002

(54) CURRENT PICKUP DEVICE FOR AN ELECTRIC VEHICLE POWERED BY A SELF-INSULATED POWER LINE

(75) Inventors: Vito Siciliano, Pieve Ligure; Alcide Del Naja, Naples, both of (IT)

(73) Assignee: Ansaldo Trasporti S.p.A., Naples (IT)

( * ) Notice: Subject to any disclaimer, the term of this patent is extended or adjusted under 35 U.S.C. 154(b) by 0 days.

(21) Appl. No.: 09/462,028

(22) PCT Filed: Jun. 30, 1998

(86) PCT No.: PCT/IT98/00182

§ 371 Date: May 9, 2000

§ 102(e) Date: May 9, 2000

(87) PCT Pub. No.: WO99/00266

PCT Pub. Date: Jan. 7, 1999

(30) Foreign Application Priority Data

Jun. 30, 1997 (IT) ......................................... T097A0570

(51) Int. Cl.[7] ............................................... B60M 1/00
(52) U.S. Cl. ....................................................... 191/18
(58) Field of Search .......................... 191/10, 13, 14, 191/16, 17, 18, 19, 45 R

(56) References Cited

U.S. PATENT DOCUMENTS 4,331,225 A * 5/1982 Bolger ........................ 191/10

6,189,664 B1 * 2/2001 Siciliano et al. ............... 191/18
6,209,693 B1 * 4/2001 Siciliano et al. ............... 191/18
6,209,694 B1 * 4/2001 Siciliano et al. ............... 191/18

FOREIGN PATENT DOCUMENTS

DE          3048730          7/1982

* cited by examiner

Primary Examiner—Mark T. Le
(74) Attorney, Agent, or Firm—Quarles & Brady LLP

(57) ABSTRACT

A current pickup device wherein a supporting structure (104), carried in articulated manner by an electric vehicle (80), supports an elongated central permanent magnet (147), and a pair of current pickup members (132a, 132b) spaced with respect to each other on opposite sides of the central magnet (147). The current pickup device may be used in conjunction with a power line wherein a number of insulated conducting elements (34) are arranged in the traveling direction (8) of the electric vehicle (80), and are supplied successively as the electric vehicle travels along the line. The permanent magnet (147) interacts with ferromagnetic reference elements (170a, 170b) extending along the power line and in a predetermined position with respect to the conducting elements (34), to position the supporting structure (104) in a self-centered position in which the field lines generated by the magnet (147) at least partly enter the ferromagnetic reference elements (170a, 170b) along a minimum path, and in which the current pickup members (132a, 132b) mate respectively with at least one conducting element (34) and a continuous ground line extending parallel to the conducting elements (34).

39 Claims, 6 Drawing Sheets

CURRENT PICKUP DEVICE FOR AN ELECTRIC VEHICLE POWERED BY A SELF-INSULATED POWER LINE

TECHNICAL FIELD

The present invention relates to a current pickup device for an electric vehicle powered by a self-insulated power line.

BACKGROUND ART

Self-insulated power lines are known, which comprise a number of substantially flat conducting plates aligned in the traveling direction of the vehicle, substantially coplanar with a horizontal surface (e.g. a road surface), and separated by insulating elements. The conducting plates are connected in succession to a power supply source by a magnetic energizing signal supplied by the electric vehicle traveling along the power line, so the electric vehicle comprises a magnetic energizing member (e.g. a permanent magnet or electromagnet) for energizing the power line and so supplying the conducting plate, and at least one current pickup member for establishing a sliding electric contact with the live plate and picking up current by which to power the electric vehicle.

One example of a self-insulated power line is described in European Patent Application EP 96113023.4, which relates to a power line in which a hollow elongated insulating enclosure is fitted on top with a number of conducting plates aligned in the traveling direction of the vehicle and separated by insulating elements interposed between adjacent conducting plates. The enclosure houses an elastically deformable strip conducting element, which extends in the traveling direction of the vehicle, comprises a strip portion made of ferromagnetic material, and is attracted by the magnetic field generated by electromagnets on the electric vehicle so as to flex a portion of the strip conducting element towards the conducting plates and so connect at least one conducting plate to a power line inside the enclosure. Another example of a self-insulated power is described in German Patent No. 1.011.914 taken out by Ludwig Reihardt, published on Jul. 11, 1957, and in which an elongated insulating enclosure, closed at the top by a number of conducting plates aligned in a straight direction and insulated from one another, houses an elastically deformable strip conducting element made of ferromagnetic material, and which is attracted by the magnetic field generated by electromagnets to flex a portion of the strip conducting element towards the conducting plates to supply at least one of the plates.

DISCLOSURE OF INVENTION

It is an object of the present invention to provide a current pickup device which may be used to advantage in conjunction with a self-insulated power line. In particular, it is an object of the present invention to provide a current pickup device integrating the magnetic energizing member and current pickup member in one structure. It is a further object of the present invention to provide a current pickup device enabling correct positioning of the current pickup member with respect to the conducting plates as the electric vehicle is moving.

According to the present invention, there is provided a current pickup device for a self-insulated power line.

BRIEF DESCRIPTION OF THE DRAWINGS

A preferred non-limiting embodiment of the invention will be described by way of example with reference to the accompanying drawings, in which.

BEST MODE FOR CARRYING OUT THE INVENTION

Figure 1:
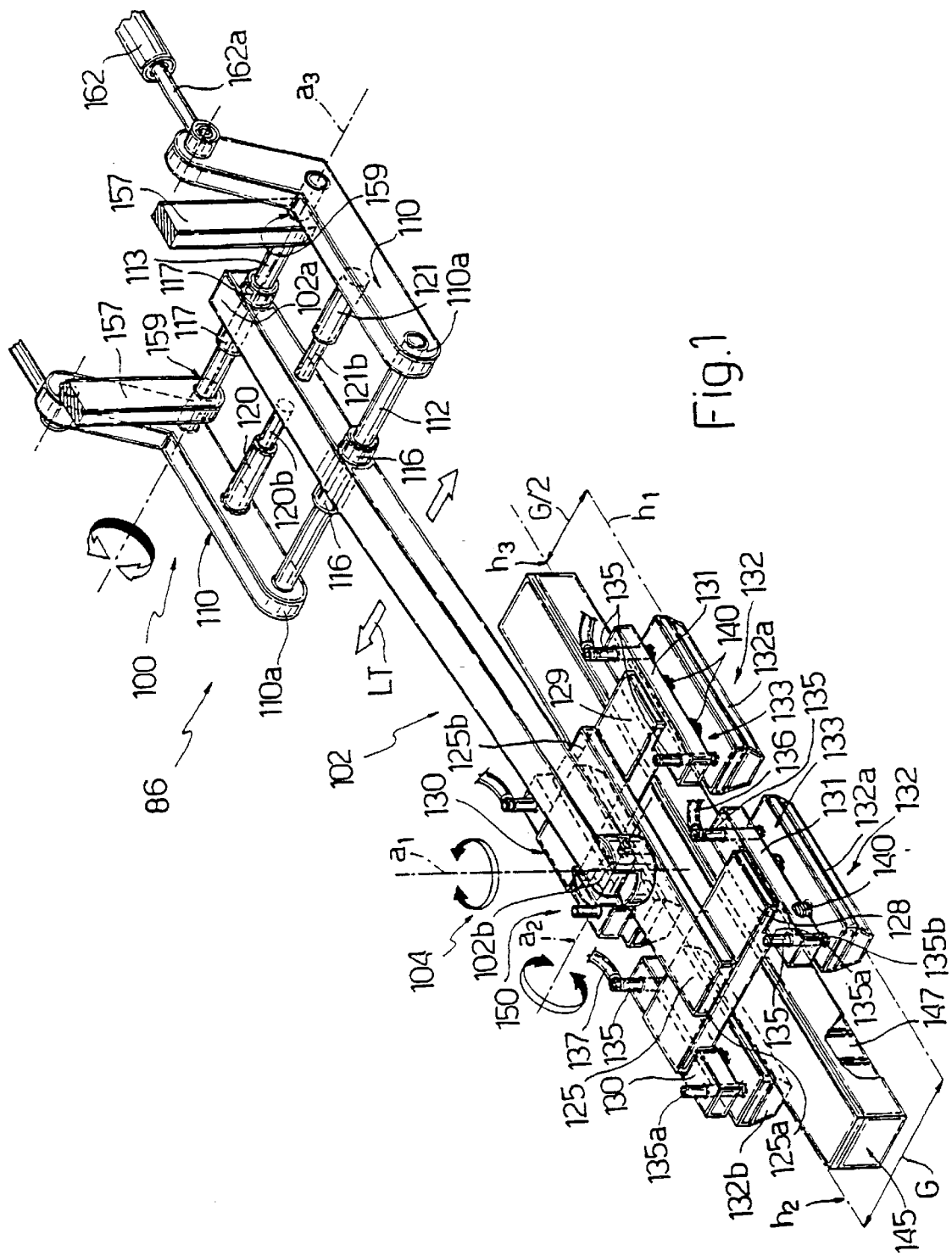
FIG. 1 shows a view in perspective of a current pickup device in accordance with the teachings of the present invention.
Figure 2:
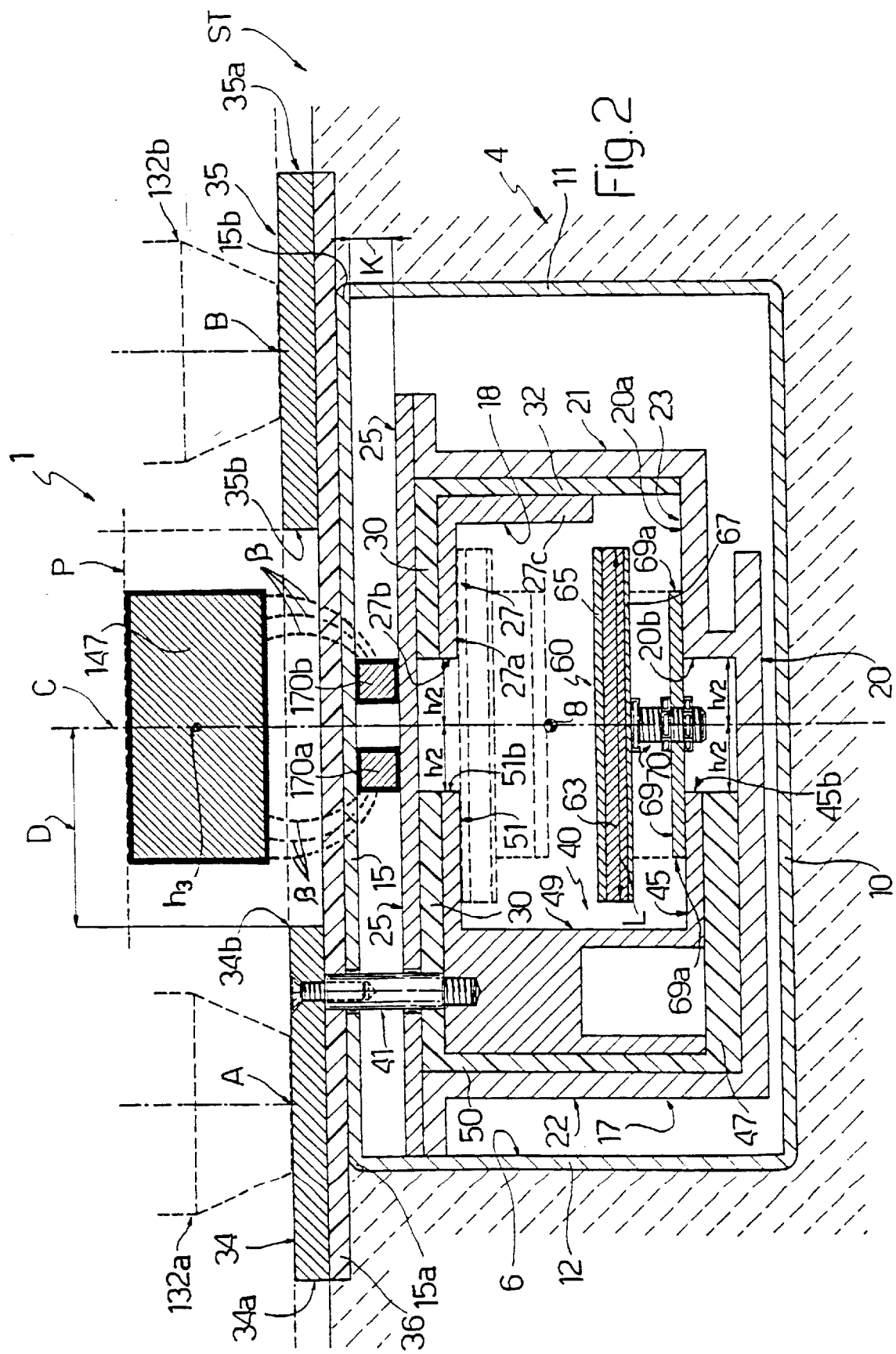
FIG. 2 shows a cross section of a self-insulated power line used in conjunction with the FIG. 1 current pickup device.

With reference to FIGS. 1 and 2, number 1 indicates as a whole a modular power line for an electric vehicle.

Power line 1 comprises a number of elongated insulating enclosures (modules) 4, each defining internally an elongated parallelepiped cavity 6 extending in a straight direction (along an axis) 8.

More specifically, each enclosure 4 is formed in one piece, and comprises a horizontal bottom insulating wall 10; two vertical lateral insulating walls 11, 12 perpendicular to wall 10; and a horizontal top insulating wall 15 parallel to and opposite bottom wall 10.

Enclosure 4 houses a metal conducting enclosure 17, which defines internally an elongated parallelepiped cavity 18 extending along axis 8, and comprises a bottom wall 20 facing wall 10; two vertical lateral walls 21, 22 integral with and perpendicular to wall 20; and a flat top metal wall 25 parallel to and separated from wall 15 by a constant distance K.

Enclosure 17 houses a first electric power conducting line 27 comprising a straight metal conducting element located in an upper portion of cavity 18 and separated electrically from adjacent metal walls 21 and 25. More specifically, conducting element 27 has a substantially L-shaped cross section, and comprises a first horizontal flat portion 27a adjacent and parallel to a flat insulating wall 30 on the underside of a lateral portion of wall 25; and a second vertical flat portion 27c perpendicular to and integral with portion 27a, and supported on a vertical insulating wall 32 parallel and adjacent to metal vertical wall 21.

Metal enclosure 17 defines a second electric power conducting line 23 extending substantially the whole length of insulating enclosure 4.

With reference in particular to FIG. 2, power line 1 comprises a number of rectangular metal plates 34 located outside enclosures 4, aligned in a straight direction A parallel to axis 8, and positioned with the long edges parallel to direction A, which extends through the center of each rectangular metal plate.

More specifically, each plate 34 is fitted to top wall 15 via the interposition of a rubber sheet 36, is connected to enclosure 4 by fastening devices (not shown), is located at a lateral edge 15a of wall 15, and has a first end edge 34a (corresponding to a first long side of the rectangular perimeter) projecting from enclosure 4, and a second end edge 34b (corresponding to a second long side of the rectangular perimeter) separated by a distance D from the central plane of symmetry C, perpendicular to walls 10 and 15, of enclosure 4.

Power line 1 also comprises a ground line 35 located outside each enclosure 4 and comprising a flat elongated rectangular element extending in a straight direction B parallel to direction A on the opposite side of plane of symmetry C, and which extends through the center of rectangular element 35.

More specifically, rectangular element 35 is fitted to top wall 15 via the interposition of rubber sheet 36, is connected to enclosure 4 by fastening devices (not shown), is located at a lateral edge 15b of wall 15, and has a first end edge 35a projecting from enclosure 4, and a second end edge 35b separated by distance D from central plane of symmetry C.

Power line 1 also comprises a number of insulating elements 37 (FIG. 3) located outside enclosures 4 and interposed between the short-side edges of rectangular plates 34. More specifically, each insulating element 37 is interposed between, and electrically separates, two adjacent metal plates 34; and each metal plate 34 communicates with a respective electric distributor 40 housed inside cavity 18 and connected to plate 34 by a respective electric conductor 41 (shown schematically) extending through insulating wall 30, metal wall 25 (from which the electric conductor is insulated), wall 15 of enclosure 4, and rubber sheet 36.

Distributor 40 substantially comprises a C-shaped metal wall, in turn comprising a first flat horizontal portion 45 supported on an insulating wall 47 superimposed on metal bottom wall 20; a second vertical portion 49 facing metal lateral wall 22 and separated electrically from wall 22 by an insulating wall 50; and a third flat horizontal portion 51 perpendicular to and integral with vertical portion 49, and contacting insulating wall 30.

Flat portions 51 and 45 are therefore parallel and face each other on opposite sides of cavity 18; and portions 51 and 45 of the various distributors 40 are located along axis 8 and along the whole length of enclosure 4 to respectively -define first and second electric collectors for the purpose explained later on.

Flat portion 45 (second collector) is coplanar with a portion 20a of the second electric power line; flat portion 45 and portion 20a are separated electrically and have respective edges 45b and 20b facing and parallel to each other; and edges 45b and 20b are equidistant (distance h/2) from plane of symmetry C.

Flat portion 51 (first collector) is coplanar with portion 27a of the first electric power line; flat portion 51 and portion 27a are separated electrically and have respective edges 51b and 27b facing and parallel to each other; and edges 51b and 27b are equidistant (distance h/2) from plane of symmetry C.

Distributor 40 comprises a strip conducting element 60 housed inside cavity 18, and which extends the whole length of enclosure 4, is substantially perpendicular to and symmetrical with plane C when in a rest position (FIG. 2), and has opposite end portions (not shown) fitted to supporting and connecting devices (not shown) at opposite ends of enclosure 4.

Strip element 60 comprises a central portion 63 defined by a strip of flexible insulating material supporting conducting portions located on opposite sides of insulating strip 63. More specifically, insulating strip 63 supports a flexible top conducting strip 65 made of ferromagnetic material, and which is integral with and superimposed on strip 63, faces wall 15, and is of a width L greater than the distance h between facing edges 51b and 27b. Insulating strip 63 also supports a flexible bottom strip 67 made of ferromagnetic material, and which is integral with the underside of strip 63, faces wall 20, and is of width L. Strip 67 is fitted underneath with a number of flat rectangular metal (e.g. copper) elements 69 facing strip 67 in a plane substantially parallel to the plane of strip 67 when undeformed. Each element 69 has short edges 69a parallel to the long edges of strip 67, and long edges of a length slightly less than width L; each flat rectangular element 69 is supported by an articulated device 70 extending from strip 67 to element 69 and made of plastic insulating material; elements 69 are equally spaced along strip element 60 with a spacing substantially equal to the distance P between adjacent distributors 40; and distance P is substantially equal to the distance, measured parallel to axis 8, between central portions of adjacent flat horizontal portions 45.

Each insulating enclosure 4 comprises, at two opposite end portions, respective supporting and connecting devices (not shown), each of which provides for supporting and permitting a substantially transverse movement of an end portion of strip conducting element 60.

Power line 1 is formed by arranging a number of enclosures 4 adjacent to one another and aligned in a straight vehicle traveling direction; the adjacent end portions (not shown) are connected mechanically by means of bridging devices (not shown) to form an overall strip element extending the whole length of line 1 and defined by the strip conducting elements 60 of the various connected enclosures 4; and electric lines 27 and 23 of one enclosure are connected electrically to the corresponding electric lines of the adjacent enclosure by means of external connecting cables (not shown). In one non-limiting embodiment, line 1 may be laid in a road surface ST (FIG. 2), with enclosures 4 housed inside a parallelepiped seat sunk into road surface ST. In which case, plates 34 and ground line 35 face upwards and are substantially coplanar with road surface ST; power line 23 and ground line 35 are conveniently connected to a ground potential; and power line 27 is connected to a positive supply potential.

Power line 1 is used in conjunction with an electric vehicle 80 (shown schematically in FIG. 3) traveling along road surface ST.

Electric vehicle 80 comprises two axles; a frame, e.g. a self-supporting frame, defined at the bottom by a floor 82 facing road surface ST, plates 34 and ground line 35; and a known electric motor 83 for powering vehicle 80 and supplied by a control circuit 85 receiving a positive voltage Val and a reference potential Vref, both picked up from line 1 by a current pickup device 86 in accordance with the teachings of the present invention.

The current pickup device according to the present invention (FIG. 1) comprises a lateral actuating device 100 fitted to floor 82 of vehicle 80; an arm 102 having a first end carried in sliding manner by device 100; and a structure 104 carried by a second end of arm 102 and having members for magnetically energizing line 1, and current pickup members which, as described later on, mate with plates 34 and ground line 35 to power electric vehicle 80.

More specifically, device 100 comprises a pair of flat L-shaped elements 110 spaced parallel to each other and connected by a pair of parallel cylindrical rods 112, 113 extending between L-shaped elements 110. More specifically, each end portion of rod 112 is fitted stably to a respective end of a long-side portion 110a of a respective L-shaped element, and each end portion of rod 113 is fitted stably to a respective elbow portion of a respective L-shaped element.

Arm 102 has a substantially rectangular cross section, and comprises, at end 102a connected to device 100, two cylindrical tubular bodies 116, 117 perpendicular to the longitudinal axis of arm 102, fitted stably to arm 102, and housing respective rods 112 and 113, so that arm 102 is movable back and forth in a straight direction LT-L perpendicular to the longitudinal axis of arm 102. The movement of arm 102 in direction LT-L may be controlled by a pair of pneumatic actuators 120, 121 located on opposite sides of arm 102 and each comprising a casing fitted stably to a respective element 110, and an output member 120b, 121b having an end portion fitted to arm 102 and movable with respect to the casing in a straight direction parallel to rods 112 and 113.

Structure 104 comprises a straight, flat, substantially rectangular central element 125 made of insulating, in particular plastic, material; and a pair of flat, rectangular insulating cross members 128, 129 perpendicular to central element 125 and having central portions fitted stably, e.g. by means of metal bolts (not shown), to end portions 125a, 125b of central element 125, so that cross members 128, 129 and central element 125 define an H-shaped insulating supporting structure. Each end portion of each straight cross member 128, 129 supports a rectangular insulating supporting pad 130, 131 with the long sides parallel to the longitudinal axis of central element 125; and each insulating pad 130, 131 supports a respective electric contact element 132 made of conducting material, located on the opposite side of pad 130, 131 to arm 102, and preferably in the form of a truncated pyramid with an elongated rectangular base. Each electric contact element 132 is spaced with respect to pad 130, 131, and is supported on a shock-absorbing device 133 permitting travel to and from pad 130, 131. More specifically, each pad 130, 131 comprises, at each end portion, a through hole engaged by a metal supporting element 135 having a top end portion 135a projecting from pad 130, 131 towards arm 102, and a bottom end portion 135b projecting downwards from pad 130, 131 and fitted stably to a long-side end portion of electric contact element 132. Metal supporting element 135 enables electric contact element 132 to move to and from pad 130, 131; and each electric contact element 132 is connected to a pair of coil springs 140 located between the long-side end portions of electric contact element 132 and the facing wall of pad 130, 131. The electric contact elements 132a on one side of central element 125 (and therefore carried by respective first ends of cross members 128, 129) are aligned in a direction h1; the electric contact elements 132b on the other side of central element 125 (and therefore carried by respective second ends of cross members 128, 129) are aligned in a direction h2 parallel to direction h1; directions h1 and h2 are separated by a constant distance G substantially equal to the distance between short-side central portions of electric contact elements 132a, 132b carried at opposite ends of the same cross member 128, 129; and electric contact elements 132a communicate with first electric cables 136 to supply circuit 85 with positive supply voltage, while electric contact elements 132b communicate with second electric cables 137 to supply circuit 85 with negative supply voltage, or vice versa.

Structure 104 also comprises an elongated parallelepiped casing 145 fitted beneath cross members 128, 129 with its longitudinal axis h3 perpendicular to cross members 128, 129 and therefore parallel to alignment directions h1 and h2. Casing 145 is also located in an intermediate position with respect to electric contact elements 132a and 132b, so that longitudinal axis h3 is an equal distance G/2 from alignment directions h1 and h2, is made of nonmagnetic material (e.g. aluminium), and houses a number of parallelepiped permanent magnets 147 packed together and aligned along axis h3.

A central portion, facing arm 102, of element 125 is connected to a free end portion 102b of arm 102 by a known articulated device 150 for permitting rotation of structure 104, with respect to arm 102, about a horizontal axis a2 perpendicular to the longitudinal axis of arm 102, and about a vertical axis a1 perpendicular to axis a2. Alternatively, articulated device 150 shown in FIG. 1 may comprise a spherical articulated device.

Actuating device 100 is hinged to floor 82 of electric vehicle 80, and is movable with respect to the floor to lift and lower structure 104. More specifically, rod 113 is carried by a pair of straight brackets 157 extending downwards from floor 82 of vehicle 80, and the respective free ends of which have respective through holes 159 aligned along an axis a3 and engaged by rod 113 which is coaxial with axis a3. Actuating device 100 is rotated about axis a3 by an actuator 162 fitted to the frame of vehicle 80 and having an output member 162a connected to a short-side end portion of one of L-shaped elements 110. More specifically, actuating device 100 is rotated by actuator 162 between a rest (raised) position in which arm 102 is substantially horizontal and coplanar with floor 82, and structure 104 is detached from line 1, and a work (lowered) position (described in detail later on) in which arm 102 forms an angle of a few degrees with floor 82, and structure 104 rests on line 1.

The distance between the central portions of plates 34 and the center of ground line 35, i.e. the distance between directions A and B, substantially equals distance G between alignment directions h1 and h2, i.e. the distance between electric contact elements 132a, 132b on opposite sides of casing 145. According to the present invention, parallelepiped cavity 6 of each enclosure 4 houses a pair of straight square-section bars 170a, 170b (each side of the section substantially equal to distance K), which are parallel to each other, are aligned along axis 8, are interposed between walls 25 and 15, are located on opposite sides of plane of symmetry C, and are separated from plane C by a small distance substantially equal to half the side of the square section.

In actual use, when power line 1 is not engaged by electric vehicle 80, conducting element 60 is in a rest position (FIG. 2) in which it is substantially undeformed and parallel to bottom wall 20. More specifically, in the rest position, conducting strip 67 is substantially parallel to bottom wall 20, and each element 69 rests, along the whole length of each enclosure 4, on portion 20a of power line 23 and on a respective flat portion 45 of a distributor 40, thus establishing an electric connection between flat portions 45 and bottom wall 20, and therefore between all of distributors 40 (and plates 34) and power line 23.

As such, plates 34 are all connected to ground potential when strip conducting element 60 is in the rest position, so that line 1 is intrinsically insulated, by virtue of all the external parts (plates 34) being at ground potential, and the live parts (line 27) being inside insulating enclosure 4 (high degree of insulation of line 1) and being housed inside metal enclosure 17 (high degree of shielding of line 1). In the rest position, in fact, power line 27 (positive) is insulated from all the other metal parts of line 1 and housed inside metal enclosure 17. More specifically, line 27 is insulated and separated physically from portion 51 (first collector).

Electric vehicle 80 is positioned over power line 1. When disconnected from power line 1, electric vehicle 80 on road surface ST is powered by a pack of auxiliary batteries 180, which are carried by vehicle 80, are connectable to control circuit 85, and are disconnected when electric vehicle 80 is connected to line 1. When positioning electric vehicle 80, arm 102 is in the raised rest position and electric contact elements 132 do not contact any part of power line 1; and electric vehicle 80 is positioned with electric contact elements 132a, 132b substantially facing plates 34 and ground respectively Arm 102 is then lowered so that electric contact elements 132a rest at least partly on plates 34, and electric contact elements 132b rest at least partly on ground line 35; in which position (FIG. 2), permanent magnets 147 are positioned facing the central portion of an enclosure 4 through which plane of symmetry C extends, and are therefore located at bars 170a and 170b. Wall 15 and rubber sheet 36, both made of nonmagnetic material, are interposed between the permanent magnets and bars 170a, 170b, so that the magnetic field lines B produced by permanent magnets 147 are directed downwards towards enclosure 4 and at least partly into straight bars 170a, 170b. A magnetic force of attraction is therefore created between magnets 147 and straight bars 170a, 170b, so that structure 104 is drawn downwards to ensure good electrical contact between contact elements 132a and plates 34, and between contact elements 132b and ground line 35. Structure 104 is also shifted laterally and centered automatically with respect to line 1, by magnets 147—for known physical reasons—being positioned at a minimum possible distance from straight bars 170a, 170b; which minimum possible distance corresponds to the FIG. 2 position, in which longitudinal axis h3 substantially extends along plane of symmetry C, and contact elements 132a, 132b are separated by distance G/2 from plane of symmetry C and are respectively located at the centers of plates 34 and ground line 35 (self-centered position).

Structure 104 is movable freely into position with respect to line 1 by arm 102 being movable laterally in direction LT-L, and structure 104 itself being permitted to rotate about axes al and a2.

In the self-centered position, part of the magnetic field lines nevertheless interact with ferromagnetic conducting strip 65, so that conducting element 60 is attracted and deformed upwards towards magnets 147. As shown clearly in FIG. 3, the portion 60a of strip conducting element 60 affected by the force of attraction arcs upwards towards wall 25. More specifically, the portion 60a of conducting element 60 located beneath structure 104 and magnets 147 (and therefore subjected to a strong force of attraction) moves into a raised work position parallel and adjacent to insulating wall 30 (FIGS. 2 and 3), with strip 65 contacting portion 27a of first power line 27 and at least one first collector 51. Via strip 65, an electric connection is therefore established between first power line 27 and first collector 51, and therefore between line 27 and a plate 34. By virtue of the design of the current pickup device described above, the force of attraction of magnets 147 is generated along the whole length of axis h3, and strip 65 is drawn upwards by a length substantially equal to the length of casing 145, and contacts the first collectors 51 of two adjacent distributors 40.

Two adjacent plates 34 beneath the supporting structure (live plates) are therefore connected to positive power line 27; and electric contact elements 132a are positioned contacting the live plates to supply positive electric power to electric motor 83. Electric contact elements 132b are also positioned contacting the ground line to supply negative electric power to electric motor 83, so that vehicle 80 is powered along road surface ST by drawing energy from line 1, and, as the vehicle travels along, contact elements 132a, 132b define a sliding electric contact with plates 34 and ground line 35 respectively. Together with coil springs 140, supporting elements 135 enable each electric contact element 132a, 132b to move to and from supporting structure 104 in a direction substantially crosswise to the traveling direction of the vehicle to compensate for any breaks or vertical unevenness of line 1.

Supporting structure 104 is movable with respect to the moving electric vehicle 80 by virtue of the connection between tubular bodies 116, 117 and rods 112, 113 enabling arm 102 to move laterally (in direction LT-L); and supporting structure 104 is also movable with respect to arm 102 by virtue of articulated device 150.

Figure 3:
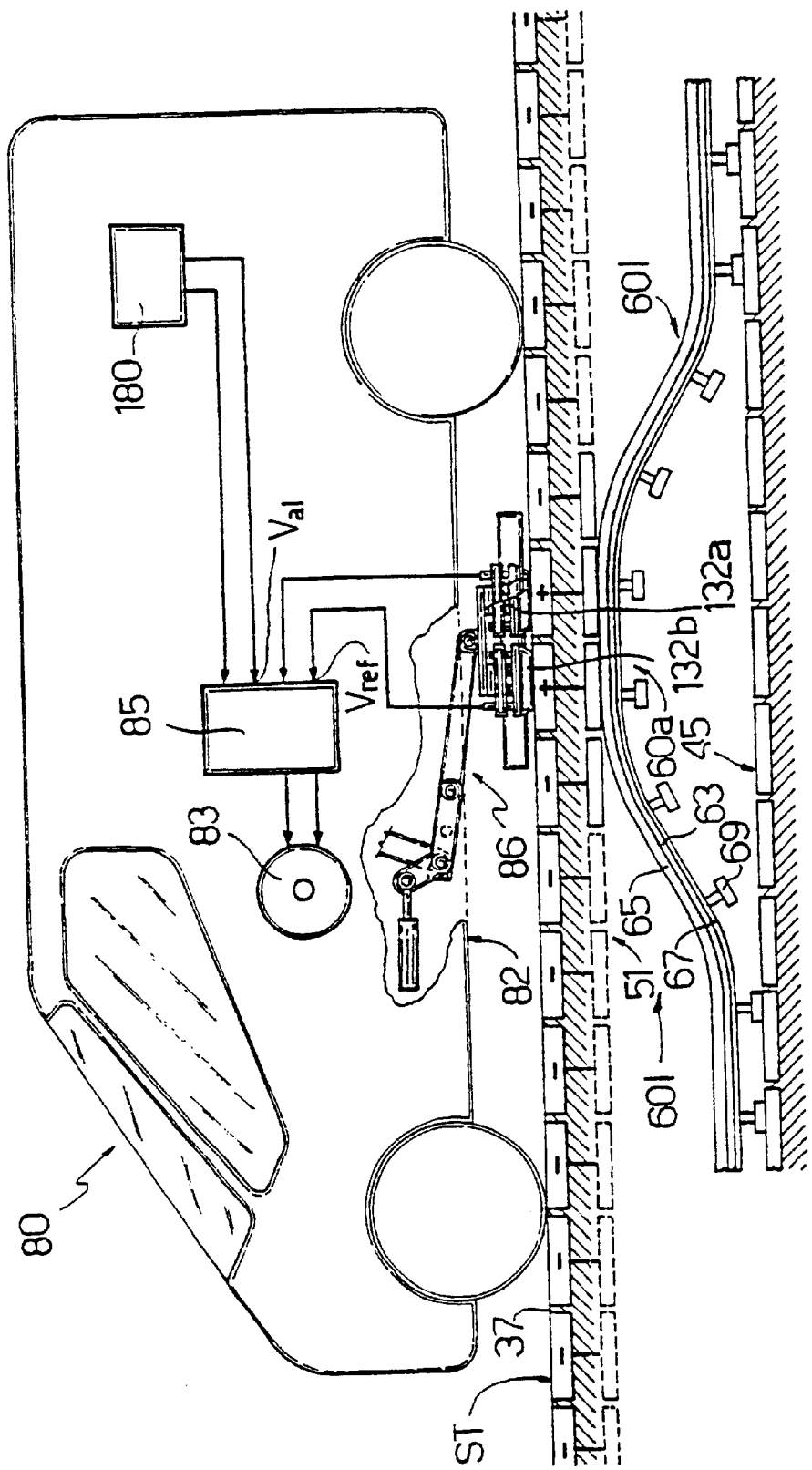
FIG. 3 shows the FIG. 1 current pickup device fitted to an electric vehicle engaging a power line of the type shown in FIG. 2.

The portions of strip conducting element 60 adjacent to portion 60a are inclined with respect to portion 60a and slope downwards by force of gravity towards wall 10; which inclined portions 601 are physically separated from first collector 51 and second collector 45 (FIG. 3), and are separated from first power line 27 and second power line 23 (FIG. 3).

Inclined portions 601 terminate at the point at which strip conducting element 60 rests on bottom wall 20 of second conducting line 23 and on second collectors 45 of distributors 40, so that all the nonlive plates 34 of line are connected to conducting line 23.

As electric vehicle 80 travels along, successive portions of strip element 60 are deformed, and portion 60a, following the movement of the electric vehicle, travels along the various enclosures 4 forming part of line 1. The arced portion 60a of strip conducting element 60 thus travels wavelike along line 1, from one end to the other of each enclosure 4, and, on reaching the end portion of one enclosure 4, moves on to the end portion of the adjacent enclosure 4.

As electric vehicle 80 travels along, the correct position of electric contact elements 132a, 132b carried by supporting structure 104 is ensured, in that any lateral swerving of the supporting structure induced by the moving vehicle moves magnets 147 away from the self-centered position described to lengthen the path of the magnetic field between magnets 147 and straight bars 107a, 107b, and is rapidly rectified when magnets 147 move back into the minimum-energy self-centered position.

Figure 4:
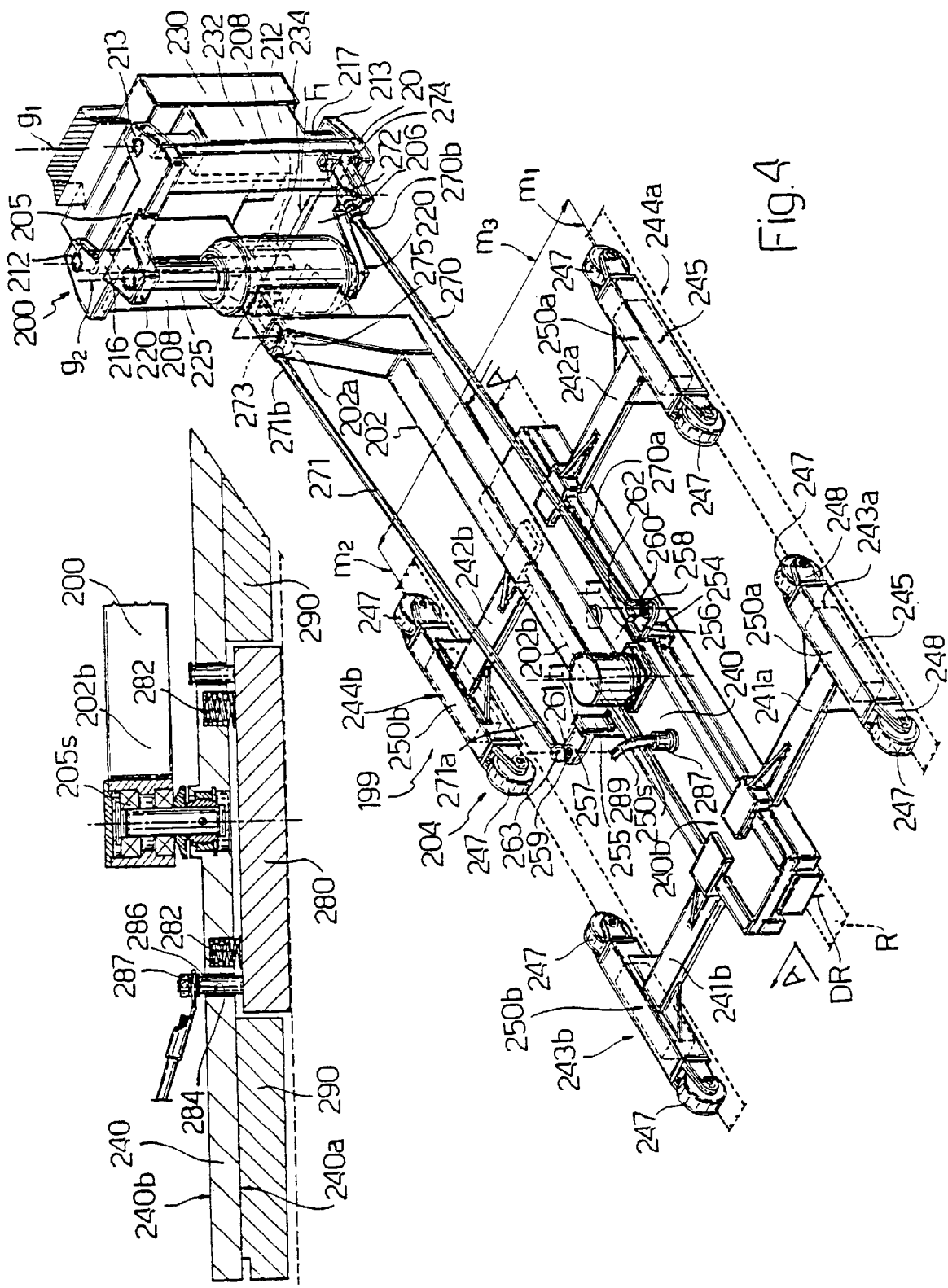
FIG. 4 shows a view in perspective of a variation of the FIG. 1 current pickup device.

The current pickup device 199 shown in FIG. 4 comprises a vertical actuating device 200 fitted to the floor 82 of vehicle 80; an arm 202 having a first end 202a connected to device 200; and a structure 204 carried by a second end 202b of arm 202, and having members for magnetically energizing line 1, and current pickup members which mate, as described later on, with line 1 to power electric vehicle 80.

More specifically, device 200 comprises a pair of parallel rectangular plates 205, 206 separated by vertical strengthening elements 208 extending parallel to each other and each having end portions connected stably to plates 205, 206. Each plate 205, 206 has two flat trapezoidal appendixes 212, 213 extending integrally from end portions of the long-side edge of plate 205, 206; each pair of facing appendixes 212, 213 is joined by a rear supporting shaft 216, 217 having end portions fitted stably to appendixes 212, 213; and shafts 216, 217 are spaced with respect to each other and extend parallel to vertical elements 208. Each plate 205, 206 also has a flat front appendix 220 extending integrally, on the opposite side to appendixes 212, 213, from a central portion of the long-side edge of plate 205, 206; and appendixes 220 face each other and are joined by a front supporting shaft 225 having end portions fitted stably to appendixes 220.

A supporting element 230 is fitted to floor 82 of electric vehicle 80, and carries a pair of roller bearings 232 spaced with respect to each other and housing rear shafts 216, 217 in sliding manner, so that roller bearings 232 and rear shafts 216, 217 define a linear guide device enabling device 200 to move with respect to element 230 in a vertical direction g1 parallel to the axes of rear shafts 216, 217. Device 200 is movable in direction g1 between two (top and bottom) limit positions corresponding to the positions in which opposite end portions of roller bearings 232 contact plates 205, 206 respectively.

Front supporting shaft 225 carries a tubular body 234, which, by means of a pneumatic actuator (not shown), slides along shaft 225 in a vertical slide direction g2 parallel to direction g1. Body 234 is movable in direction g2 between a bottom limit position in which the bottom end of body 234 rests on appendix 220 of plate 206, and a top limit position in which the top end of body 234 rests against appendix 220 of plate 205; body 234 and front shaft 225 are connected by means of a roller bearing (not shown) enabling body 234 to rotate freely about the axis of shaft 225 and therefore about direction g2; and the first end 202a of arm 202 is fitted stably to and extends radially from body 234.

Viewed from above, structure 204 is in the form of an H, and comprises a flat rectangular central section 240; and four straight arms 241a, 241b, 242a, 242b extending in pairs from opposite portions of and on opposite sides of section 240. The free end of each arm 241a, 241b, 242a, 242b supports a carriage 243a, 243b, 244a, 244b comprising an elongated parallelepiped casing 245 positioned with the longitudinal axis perpendicular to the respective supporting arm, and fitted at each end portion with a wheel 247. Each wheel 247 is carried by a pair of parallel flanges 248 extending from square-end portions of parallelepiped casing 245, and is of such a diameter that, when positioned contacting a flat horizontal rolling surface R in a lowered position of structure 204, casing 245 and the respective supporting arm are separated vertically by a constant distance from rolling surface R. In the lowered position of structure 204, a first rectangular bottom face 240a of section 240 is also separated by a distance DR from rolling surface R. Each parallelepiped casing 245 is made of nonmagnetic material (e.g. aluminium), and houses an elongated permanent magnet 250 positioned with its axis parallel to the axis of casing 245 and parallel to the longitudinal axis PF of flat rectangular section 240; the longitudinal axes of each pair of elongated magnets 250a, 250b on the same side of central section 240 are aligned in a respective straight alignment direction m1, m2; and directions m1 and m2 are parallel to each other and separated by a distance m3.

Device 200 is connected to arm 202 by a spherical joint 250s (known) interposed between a central portion of a top face 240b (opposite face 240a) of section 240 and the second end 202b of arm 202.

Close to and on opposite sides of spherical joint 250s, section 240 carries a pair of straight vertical arms 254, 255 having respective bottom end portions fitted stably to respective central portions of respective long-side edges of section 240, and respective top end portions from which extend, perpendicular to arms 254, 255, respective straight horizontal arms 256, 257 aligned in a direction t1 crosswise to directions m1, m2, and extending on opposite sides of section 240. The free end of each horizontal arm 256, 257 is connected, by a respective first spherical joint 258, 259, to a first end portion of a respective connecting arm 260, 261 having a second end portion connected, by a respective second spherical joint 262, 263, to a first end portion 270a, 271a of a respective rod 270, 271 extending alongside arm 202. Rods 270, 271 extend on opposite sides of arm 202, and have respective second end portions 270b, 271b connected, by respective third spherical joints 272, 273, to respective parallel straight appendixes 274, 275 extending from respective edge portions of rectangular plate 206, on the same side as appendix 220. The center distance F1 between the centers of joints 272, 273 is substantially equal to the distance between second spherical joints 262, 263, and extends through the axis of front shaft 225.

Section 240 is fitted underneath (FIG. 4) with an electric contact element 280 defined by a parallelepiped conducting body extending from a central portion of bottom face 240a and fitted to a shock-absorbing device 282 for enabling body 280 to move to and from face 240a, and for insulating body 280 and section 240. At an end portion of body 280, section 240 comprises a through hole 284 lined entirely with an insulating sleeve 286 and engaged by a cylindrical metal body 287 having a first bottom end fitted to body 280, and a top end projecting from top face 240b and defining a connecting terminal to which is fitted an electric cable 289 by which to supply vehicle 80. Section 240 is also fitted with a number of permanent magnets 290 arranged along axis PR, along the whole length of face 240a, and on opposite sides of electric contact element 280.

Current pickup device 199 is used in conjunction with a power line 1a similar to the one shown in FIGS. 2 and 3, and the parts of which identical in form and/or operation to those already described are indicated using the same numbering system with no further description. Line 1a has no ground line 35, and comprises plates 34 having respective edges 34b beyond plane of symmetry C, and extending substantially over at least more than half of wall 15 and preferably over the entire width of wall 15. Moreover, straight square-section bars 170a and 170b are housed outside enclosure 4 and substantially coplanar with road surface ST. More specifically, a first straight bar 170a is adjacent to and separated from edge 34a by a constant distance $X_1$, and extends parallel to axis 8 along the whole length of line 1a; a second straight bar 170b is adjacent to and separated from edge 34b by a constant distance $X_2$ (preferably equal to $X_1$), and extends parallel to axis 8 along the whole length of line 1a; and the distance between parallel bars 170a, 170b is substantially equal to m3.

Figure 5:
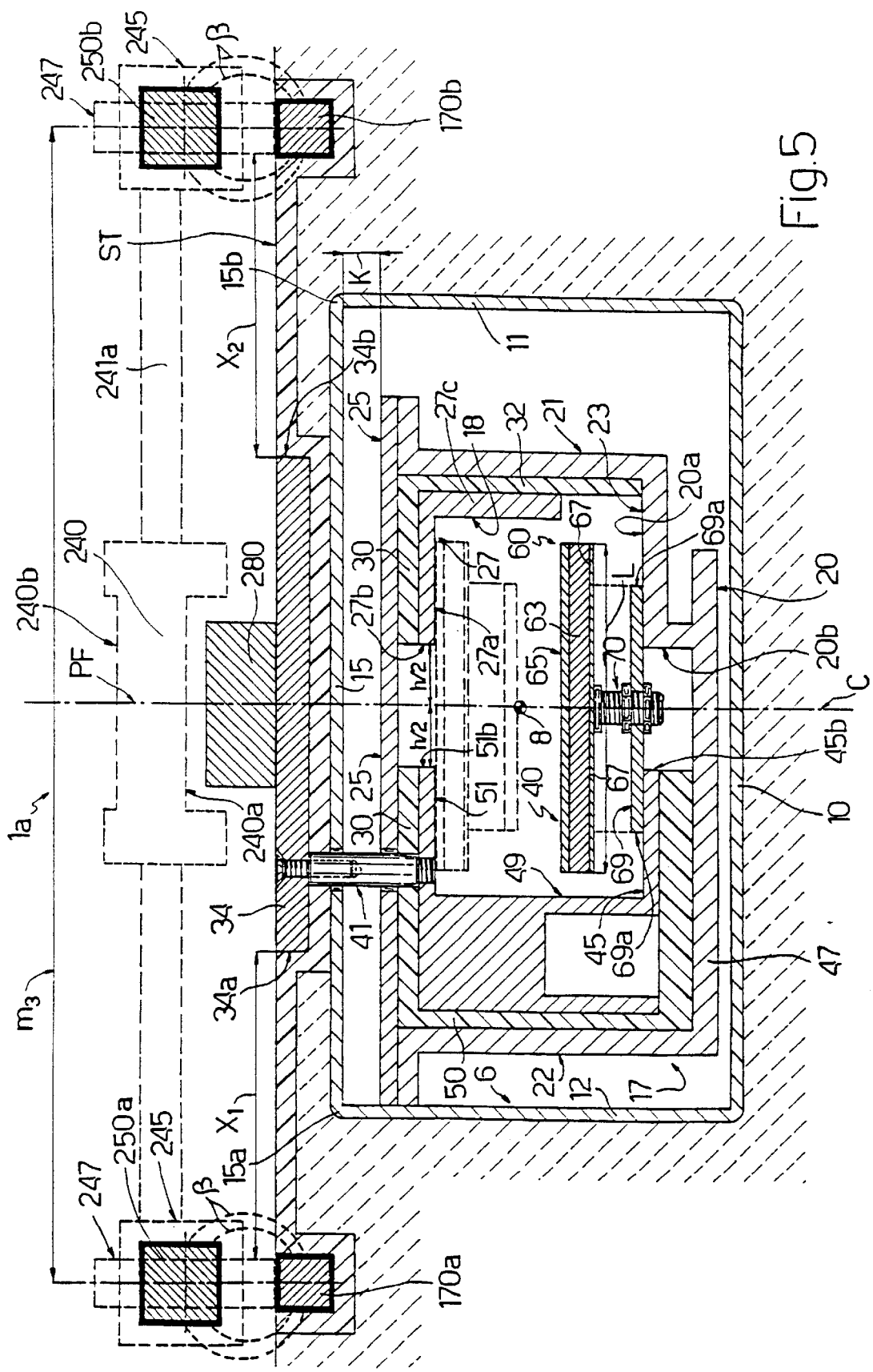
FIG. 5 shows a cross section of a self-insulated power line used in conjunction with the FIG. 4 current pickup device.
Figure 6:
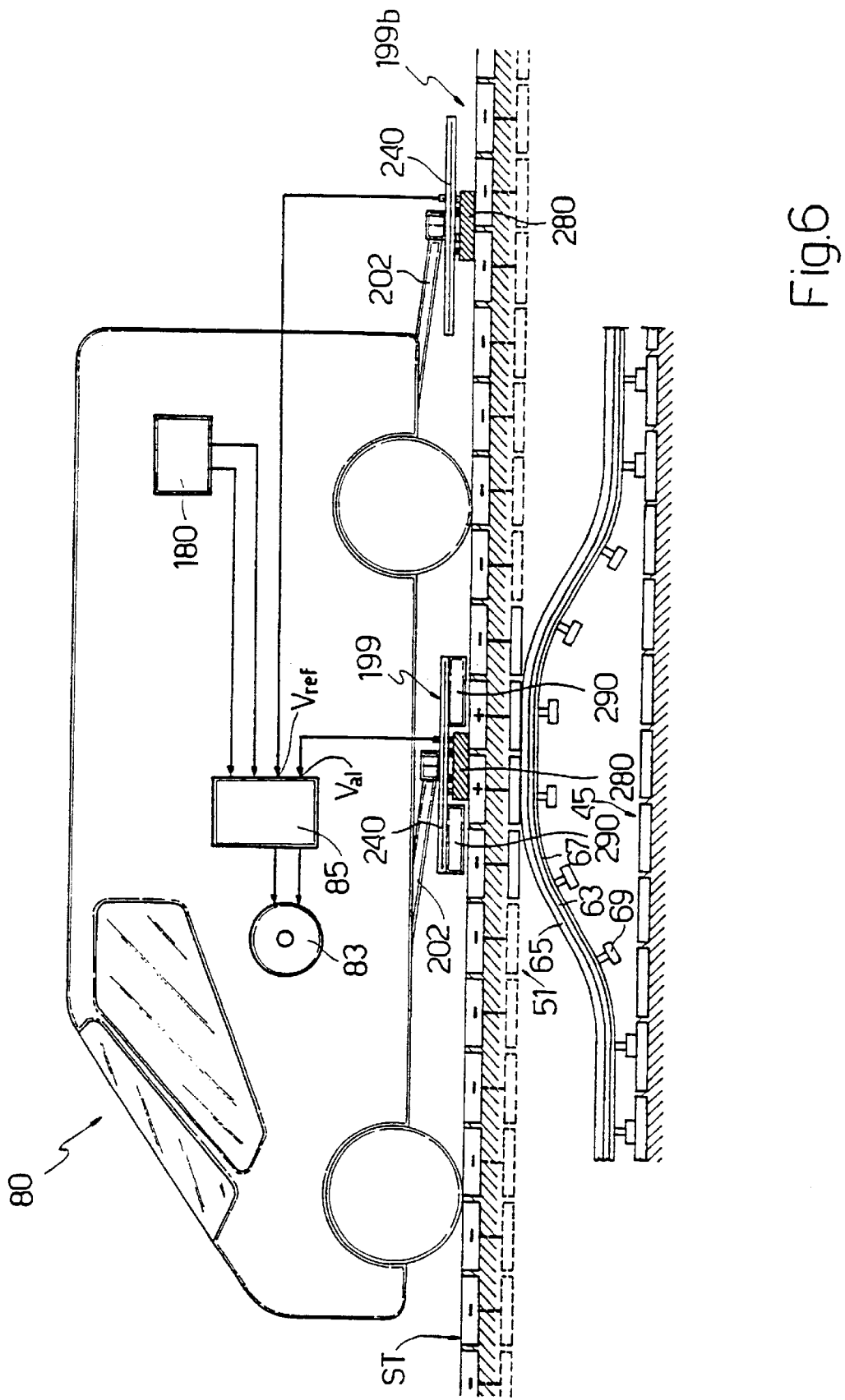
FIG. 6 shows the FIG. 4 current pickup device fitted to an electric vehicle engaging a power line of the type shown in FIG. 5.

In actual use, electric vehicle 80 is positioned over power line 1a. When positioning electric vehicle 80, arm 202 is set to a raised rest position in which electric contact element 280 contacts no part of power line 1a, and in which the top portions of bearings 232 contact plate 205; and electric vehicle 80 is positioned so that electric contact element 280 substantially faces a central portion of plates 34. Arm 202 is then lowered by means of the pneumatic actuator (not shown), which moves body 234 downwards in direction g2 so that electric contact element 280 rests on plates 34, and wheels 247 rest on road surface ST defining rolling surface R. In which lowered position (FIG. 5), permanent magnets 290 face the central portion of an enclosure 4 and are detached from plates 34, and bearings 232 are set to an intermediate position along shafts 216, 217 to enable device 200 to move with respect to supporting bracket 230 and therefore with respect to floor 82 of vehicle 80.

Moreover, permanent magnets 250a are located close to bar 170a; permanent magnets 250b are located close to bar 170b; permanent magnets 250a, 250b and respective bars 170a, 170b are separated solely by air, so that the magnetic field lines β generated by permanent magnets 250a, 250b are directed downwards towards road surface ST and mostly into straight bars 170a, 170b; and a magnetic force of attraction is created between magnets 250a, 250b and straight bars 170a, 170b, so that structure 204 is drawn downwards to ensure good electric contact between contact element 280 and plates 34. Structure 204 is also shifted laterally and centered automatically with respect to line 1a, by magnets 250a, 250b—for known physical reasons—being positioned at a minimum possible distance from straight bars 170a, 170b; which minimum possible distance corresponds to the FIG. 5 position, in which longitudinal axis PF of section 240 substantially extends along plane of symmetry C, and contact element 280 is located at the center of a plate 34 (self-centered position). Structure 204 is movable freely into position with respect to line 1a by arm 202 being allowed to rotate about device 200 (direction g2), thus enabling lateral movement of structure 204, which is also movable with respect to end 202b of arm 202 by virtue of spherical joint 250s.

The attraction exerted by magnets 290 on strip conducting element 60 provides, as already described, for supplying at least one plate 34, on which electric contact element 280 defines a sliding contact to draw positive power by which to power the electric vehicle. Negative power may be supplied by a current pickup device designed to contact a plate 34 connected to the negative power line. Preferably, though not exclusively, electric vehicle 80 comprises a current pickup device 199 of the type described above, housed beneath floor 82 of vehicle 80 in a position not easily accessible from the outside, and for drawing positive power; and a current pickup device 199b similar to device 199, but having no magnets 290, and projecting from a rear portion of vehicle 80. Being incapable of raising strip element 60, device 199b comprises an electric contact element 280 defining a sliding electric contact with the grounded plates 34 to draw negative power.

The parallelogram structure defined by rods 270 and 271, each connected in articulated manner at opposite ends to device 200 and supporting structure 204, provides, as arm 202 rotates about direction g2, for maintaining the longitudinal axis PF of supporting structure 204 substantially parallel to the longitudinal axis of electric vehicle 80; and connecting arms 260, 261, fitted with spherical joints at both ends, provide for obtaining a parallelogram structure in which rods 270 and 271 may even be positioned other than perfectly parallel and in different planes to operate spherical joint 250s and tilt supporting structure 204 with respect to arm 202.

As electric vehicle 80 travels along, correct centering of electric contact element 280 on plates 34 is ensured, in that any lateral swerving of supporting structure 204 induced by the moving vehicle moves magnets 250a, 250b away from the self-centered position described to lengthen the path of the magnetic field between magnets 250a, 250b and straight bars 170a, 170b, and is rapidly and automatically rectified when magnets 250a, 250b move back into the minimum-energy self-centered position.

The current pickup device described may therefore be used to advantage in conjunction with a self-insulated power line; integrates the magnetic energizing member (magnets 147 housed inside casing 145) and the current pickup member (electric contact elements 132) in a single structure (104); and provides for correctly positioning the current pickup member with respect to conducting plates 34 and ground line 35 as the electric vehicle is moving.

Moreover, power line 1 is so designed that all the external conducting parts (plates 34) of line 1 are normally connected to ground potential (power line 23) when line 1 is not engaged by the electric vehicle; plates 34 are only connected to power line 27 (e.g. to a positive supply potential) when power line 1 is engaged by electric vehicle 80; and the live plates 34 are located beneath the electric vehicle and therefore inaccessible.

Power line 1 therefore provides for a high degree of intrinsic safety (having no permanently live parts), and may even be laid in locations accessible to users and vehicle personnel.

What is claimed is:

1. A current pickup device for a self-insulated power line, comprising:
    a supporting structure fittable to an electric vehicle for co-operating with said power line;
    magnetic attracting means carried by said supporting structure; and
    at least one current pickup member carried by said supporting structure and in a predetermined position with respect to said magnetic attracting means;
    said self-insulated power line comprising a number of conducting elements arranged in a traveling direction of the electric vehicle and electrically separated from one another; said conducting elements being supplied with power successively as said electric vehicle travels along said power line;
    said self-insulated power line having ferromagnetic reference elements extending along the power line and in a predetermined position with respect to said conducting elements; said magnetic attracting means interacting magnetically with said ferromagnetic reference elements to automatically position said supporting structure in a self-centered position in which field lines generated by said magnetic attracting means at least partly enter said ferromagnetic reference elements along a minimum path; said current pickup member mating with at least one said conducting element in said self-centered position.

2. A device as claimed in claim 1, wherein said magnetic attracting means are separated by a predetermined space from said current pickup member on said supporting structure; said ferromagnetic reference elements being separated from said conducting elements in a direction transverse to the traveling direction of said vehicle, by a distance substantially equal to said predetermined space.

3. A device as claimed in claim 1, wherein said magnetic attracting means comprise at least one elongated magnetic element carried by said supporting structure and extending along an axis; said ferromagnetic reference elements extending in an alignment direction substantially parallel to said traveling direction of the vehicle.

4. A device as claimed in claim 3, wherein said elongated magnetic element comprises at least one permanent magnet.

5. A device as claimed in claim 3, wherein said elongated magnetic element comprises a number of permanent magnets aligned along said axis.

6. A device as claimed in claim 1, wherein said current pickup member comprises at least one prismatic body carried by said supporting structure and defining a sliding electric contact with said conducting elements.

7. A device as claimed in claim 6, further comprising positioning means enabling said prismatic body to move to and from said supporting structure in a direction substantially transverse to said traveling direction of said vehicle.

8. A device as claimed in claim 1, further comprising articulated connecting means extending between said supporting structure and an anchoring portion fittable to a portion of said electric vehicle, in particular to a floor of the vehicle; said articulated connecting means enabling said supporting structure to move with respect to said anchoring portion.

9. A device as claimed in claim 8, wherein said articulated connecting means comprise:
   a supporting device carried by said vehicle;
   an arm having a first end connected to said supporting device; and
   linear moving means interposed between said first end of said arm and said supporting device to permit a lateral movement of said arm parallel to a first axis;
   said arm having a second end supporting said supporting structure.

10. A device as claimed in claim 9, wherein said articulated connecting means also comprise articulating means interposed between said second end and said supporting structure; said articulating means enabling said supporting structure to rotate with respect to said second end, about a substantially horizontal second axis transverse to a longitudinal axis of said arm, and about a substantially vertical third axis perpendicular to said second axis.

11. A device as claimed in claim 9, further comprising actuating means interposed between a portion of said electric vehicle and said supporting device to rotate said supporting device in opposite rotation directions about a portion fitted to said vehicle, so as to lift and lower said supporting structure with respect to said power line.

12. A device as claimed in claim 1, further comprising a second current pickup member carried by said supporting structure and in a predetermined position with respect to said magnetic attracting means and said at least one current pickup member;
   said self-insulated power line comprising a continuous conducting element extending in the traveling direction of the electric vehicle; said second current pickup member mating with said continuous conducting element in said self-centered position.

13. A device as claimed in claim 12, wherein said current pickup member and said second current pickup member are located on opposite sides of said magnetic attracting means.

14. A device as claimed in claim 13, wherein said supporting structure, viewed from above, is H-shaped, and comprises a straight central element, and two straight cross members perpendicular to said straight central element; opposite end portions of each of said straight cross members carrying said current pickup member and said second current pickup member; and said straight central element carrying said magnetic attracting means.

15. A device as claimed in claim 1, wherein said supporting structure is made of insulating material, in particular plastic material.

16. A device as claimed in claim 1, wherein
   said magnetic attracting means comprise first magnetic attracting means carried by said supporting structure; and second magnetic attracting means carried by said supporting structure and separated on said supporting structure from said first magnetic attracting means;
   said first magnetic attracting means interacting with first ferromagnetic reference elements, and said second magnetic attracting means interacting with second ferromagnetic reference elements separated along said power line from said first ferromagnetic reference elements, to position said supporting structure in said self-centered position.

17. A device as claimed in claim 16, wherein said first magnetic attracting means and said second magnetic attracting means are located on opposite sides of said current pickup member.

18. A device as claimed in claim 16, wherein said first magnetic attracting means comprise magnetic elements extending in a straight first direction; and said second magnetic attracting means comprise magnetic elements extending in a straight second direction; said first and second directions being spaced and parallel to each other.

19. A device as claimed in claim 16, wherein said supporting structure carries at least one pair of wheels defining a rolling contact between said supporting structure and a rolling surface on which the supporting structure is rested in use; said pair of wheels being of such a diameter as to define a gap between said magnetic attracting means and said power line.

20. A device as claimed in claim 19, wherein said supporting structure comprises first housing means for housing said first magnetic attracting means, and second housing means for housing said second magnetic attracting means; said first and said second housing means each having a respective pair of wheels.

21. A device as claimed in claim 16, further comprising articulated supporting means extending between a portion of said electric vehicle, in particular a floor of the vehicle, and said supporting structure; said articulated supporting means comprising:
   a guiding and supporting arm;
   second articulating means, in particular spherical articulating means, interposed between a first end of said arm and said supporting structure; and
   hinge means interposed between a second end of said arm and supporting means carried by said vehicle and for supporting said arm; said hinge means enabling said arm to rotate, with respect to said supporting means, about a substantially vertical hinge axis.

22. A device as claimed in claim 21, wherein said hinge means also define linear actuating means for permitting reversible linear displacement of said second end of said arm with respect to the supporting means and along said vertical hinge axis to lift and lower said supporting structure with respect to said power line.

23. A device as claimed in claim 22, wherein said hinge means comprise:
   a shaft carried by said supporting means and coaxial with said vertical hinge axis; and
   a tubular body slidable axially along said shaft and free to rotate about the shaft; said second end of said arm being fitted to said tubular body.

24. A device as claimed in claim 21, further comprising linear guide means interposed between said supporting means and an anchoring element fitted stably to said vehicle; said linear guide means enabling said supporting means to move, with respect to said vehicle, in a direction parallel to said vertical hinge axis.

25. A device as claimed in claim 21, further comprising a parallelogram structure, in turn comprising a first rod and a second rod, which extend alongside and on opposite sides of said arm, and have respective first ends connected by means of respective first articulated joints, in particular first spherical articulated joints, to a portion of said supporting means, and respective second ends connected in articulated manner to said supporting structure.

26. A device as claimed in claim 25, wherein said parallelogram structure comprises intermediate connecting elements having respective first ends connected by means of respective second articulated joints, in particular second spherical articulated joints, to respective said second ends of said first rod and said second rod, and respective second ends connected by means of respective third articulated joints, in particular third spherical articulated joints, to said supporting structure.

27. A transport system comprising:

an electric vehicle;

a self-insulated power line wherein a number of conducting elements are arranged in a traveling direction of the electric vehicle and separated electrically from one another; said conducting elements being supplied with power successively as said electric vehicle travels along said power line; and a current pickup device carried by said electric vehicle, and which mates with said power line to draw electric power for said vehicle;

wherein said self-insulated power line has ferromagnetic reference elements extending along the power line and in a predetermined position with respect to said conducting elements;

said current pickup device comprising:

a supporting structure;

magnetic attracting means carried by said supporting structure; and at least one current pickup member carried by said supporting structure and in a predetermined position with respect to said magnetic attracting means;

said magnetic attracting means interacting magnetically with said ferromagnetic reference elements to automatically position said supporting structure in a self-centered position in which the field lines generated by said magnetic attracting means at least partly enter said ferromagnetic reference elements along a minimum length path; said current pickup member mating with at least one said conducting element in said self-centered position.

28. A transport system as claimed in claim 27, wherein said power line comprises:

at least a first conducting line supplied with first polarity;

strip means extending in said traveling direction and substantially along the whole length of the power line; and housing means for housing at least said strip means;

said strip means being elastically deformable, and comprising at least a portion made of ferromagnetic material; said portion made of ferromagnetic material interacting with a magnetic field from said current pickup member to attract at least a portion of said strip means into a contact position in which an electric connection is established between said first conducting line and at least one conducting element.

29. A transport system as claimed in claim 27, wherein said conducting elements comprise plates separated electrically from one another, carried by said housing means, and aligned in said traveling direction.

30. A transport system as claimed in claim 27, wherein each conducting element communicates electrically with first collector means and second collector means housed inside a cavity;

said cavity also housing said first conducting line and a second conducting line separated from the first conducting line;

said strip means establishing an electrical contact between said second conducting line and said second collector means as regards the portions of said strip means in a rest position in which the strip means are elastically undeformed and rest on said second collector means and on said second conducting line; and said strip means establishing an electrical contact between said first conducting line and said first collector means as regards the portions of said strip means in said contact position.

31. A transport system as claimed in claim 30, wherein said first collector means and said second collector means comprise flat conducting portions housed inside said cavity and facing each other on opposite sides of the cavity;

said first conducting line and said second conducting line comprising respective flat elongated conducting portions housed inside said cavity, facing each other, and extending substantially the whole length of said housing means;

said strip means comprising:

strip insulating means extending substantially the whole length of said housing means;

first ferromagnetic conducting elements carried on a first side of said strip insulating means and facing said first collector means and said first conducting line;

second conducting elements carried on a second side of said strip insulating means and facing said second collector means and said second conducting line;

said second conducting elements establishing an electric bridge connection between said second conducting line and said second collector means as regards the portions of said strip means in said rest position; and said first ferromagnetic conducting elements establishing an electric bridge connection between said first conducting line and said first collector means as regards the portions of said strip means in said contact position.

32. A transport system as claimed in claim 31, wherein said first conducting line comprises a contact portion substantially coplanar with a contact portion of said first collector means;

said first ferromagnetic conducting elements being of a width greater than the distance between adjacent edges of said contact portions of said first collector means and said first conducting line;

said first ferromagnetic conducting elements being interposed, as regards the portion of said strip means in said contact position, between said contact portion of the first collector means and the contact portion of the first conducting line.

33. A transport system as claimed in claim 31, wherein said second conducting line comprises a contact portion substantially coplanar with a contact portion of said second collector means;

said second conducting elements being of a width greater than the distance between adjacent edges of said contact portions of said second collector means and said second conducting line;

said second conducting elements being interposed, as regards the portion of said strip means in said rest position, between said contact portion of the second collector means and the contact portion of the second conducting line.

34. A transport system as claimed in claim 27, wherein said current pickup device comprises a second current pickup member carried by said supporting structure and in a predetermined position with respect to said magnetic attracting means and said at least one current pickup member;

said self-insulated power line comprising a continuous element extending in the traveling direction of the electric vehicle; said second current pickup member mating with said continuous conducting element in said self-centered position.

35. A transport system as claimed in claim 34, wherein said at least one current pickup member and said second current pickup member are located on opposite sides of said magnetic attracting means.

36. A transport system as claimed in claim 27, wherein said magnetic attracting means are separated by a predetermined space from said at least one current pickup member on said supporting structure; said ferromagnetic reference elements being separated from said conducting elements, in a direction transverse to the traveling direction of said vehicle, by a distance substantially equal to said predetermined space.

37. A transport system as claimed in claim 27, wherein said magnetic attracting means comprise at least one elongated magnetic element carried by said supporting structure and extending along an axis; said ferromagnetic reference elements extending in a direction substantially parallel to said traveling direction of the vehicle.

38. A transport system as claimed in claim 27, wherein said magnetic attracting means comprise first magnetic attracting means carried by said supporting structure; and second magnetic attracting means carried by said supporting structure and separated on said supporting structure from said first magnetic attracting means;

said power line comprising first ferromagnetic reference elements and second ferromagnetic reference elements separated along said power line from said first ferromagnetic reference elements, and both extending in said traveling direction of the vehicle; said first magnetic attracting means interacting with said first ferromagnetic reference elements, and said second magnetic attracting means interacting with said second ferromagnetic reference elements, to position said supporting structure in said self-centered position.

39. A transport system as claimed in claim 38, wherein said first magnetic attracting means and said second magnetic attracting means are located on opposite sides of said current pickup member.

* * * * *